C. A. SMITH.
Percolating Apparatus.
No. 5,372. Patented Nov. 20, 1847.
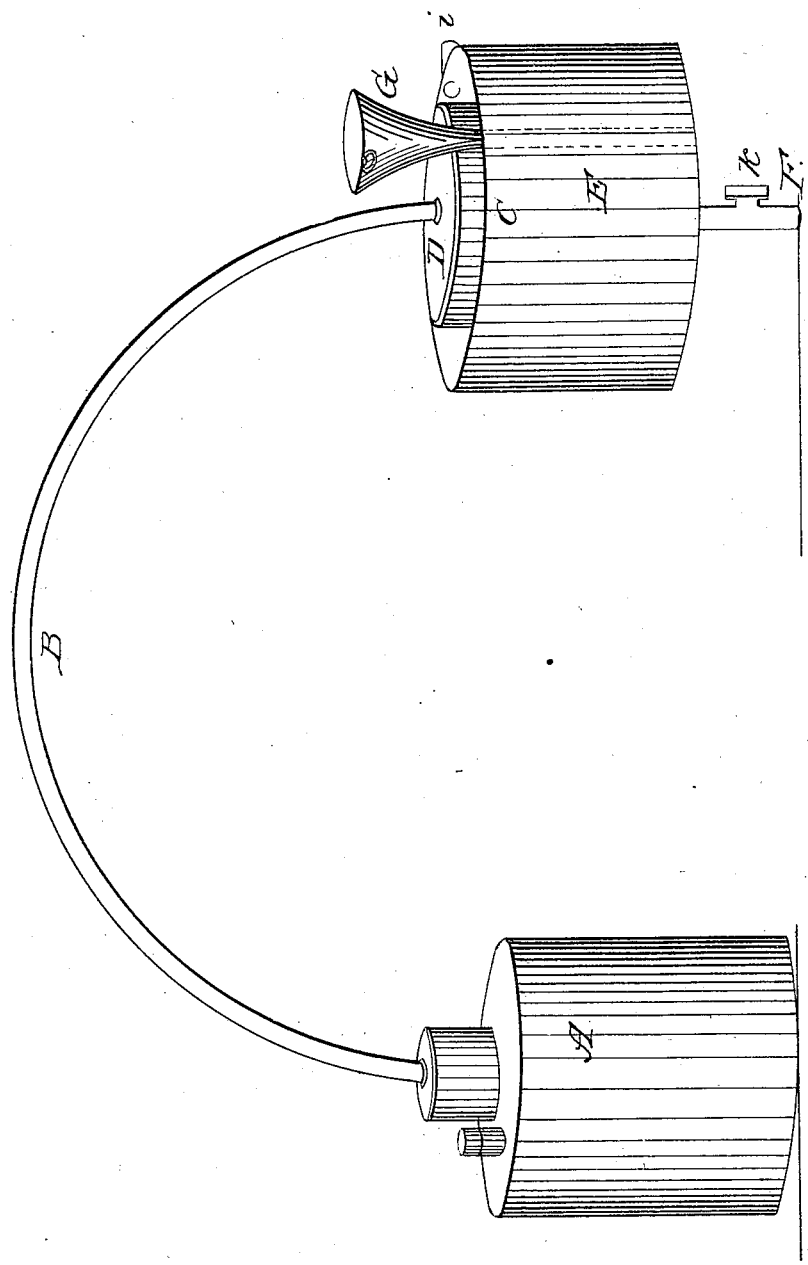

UNITED STATES PATENT OFFICE.

C. AUGUSTUS SMITH, OF CINCINNATI, OHIO.

PERCOLATING APPARATUS.

Specification of Letters Patent No. 5,372, dated November 20, 1847.

*To all whom it may concern:*

Be it known that I, C. AUGUSTUS SMITH, of Cincinnati, in the county of Hamilton and State of Ohio, have invented a new and Improved Process of Extracting the Medicinal or other Valuable Properties from Vegetable Substances; and I do hereby declare the following to be a full, clear, and exact description thereof, reference being had to the accompanying drawing, making a part of this specification, in which—

A, is an evaporator, or boiler.

B, is a pipe connecting the evaporator with the cap D, of a percolator C.

E, is a condenser, or casing, inclosing the percolator.

F, is a discharge pipe leading from the bottom of the percolator.

K, is a stop cock in the pipe F.

G, is a funnel at the top of the vertical pipe $h$, passing down the side of the condenser E, nearly to the bottom of the same. The percolator is constructed in any well known or usual manner, (having an adjustable sieve placed within the same.) The vegetable substance from which an extract is to be made, is placed in the percolator, and the menstruum is placed in the evaporator; heat is then applied to the evaporator, the steam and vapor from which is conducted into the percolator through the pipe B, and diffuses itself through the vegetable substances placed therein. A stream of cold water is admitted into the bottom of the condenser through the funnel G, and pipe $h$. The water rises in the condenser around the percolator, and is discharged through the pipe $i$, at the top of the same. The water in flowing around the percolator from its base to the top, condenses the steam among the vegetable substances in the same, and the liquor of condensation passes off through the pipe F. This liquor is placed in the evaporator, and evaporized into the percolator and condensed again, continuing the operation till everything but the fibers have been extracted from the vegetable substances placed in the percolator.

By my improved process, but a few hours are required to extract every medicinal, coloring, or other valuable property from a vegetable body, leaving nothing but the fibers. The steam penetrates and dissolves the soluble parts of a vegetable substance, and being gradually condensed while it is diffused among the same, the condensed liquid carries with it every virtue contained therein. The body of cold water surrounding the base of the percolator, reduces the temperature of the condensed liquid to such a degree before it escapes through the pipe F, that no portion of the essential oils are lost by volatilization.

What I claim as my invention and desire to secure by Letters Patent, is—

The process of extracting the medicinal or other valuable properties from vegetable substances substantially as herein described: viz—placing the vegetable substances in a percolator, passing a current of steam or vapor into the same, and gradually condensing the steam or vapor while it is diffused among the vegetable substances, by means of a suitable condenser combined with the percolator substantially as herein set forth.

C. AUGST. SMITH.

Witnesses:
Z. C. ROBBINS,
GUY C. HUMPHRIES.